(12) United States Patent
Lian et al.

(10) Patent No.: US 11,321,583 B2
(45) Date of Patent: May 3, 2022

(54) IMAGE ANNOTATING METHOD AND ELECTRONIC DEVICE

(71) Applicant: CLOUDMINDS (SHENZHEN) ROBOTICS SYSTEMS CO., LTD., Guandong (CN)

(72) Inventors: Shiguo Lian, Guandong (CN); Zhaoxiang Liu, Guandong (CN); Ning Wang, Guandong (CN); Yibing Nan, Guandong (CN)

(73) Assignee: CLOUDMINDS ROBOTICS CO., LTD., Shanghai (CN)

( * ) Notice: Subject to any disclaimer, the term of this patent is extended or adjusted under 35 U.S.C. 154(b) by 213 days.

(21) Appl. No.: 16/576,234

(22) Filed: Sep. 19, 2019

(65) Prior Publication Data

US 2020/0012888 A1    Jan. 9, 2020

Related U.S. Application Data

(63) Continuation of application No. PCT/CN2017/077253, filed on Mar. 20, 2017.

(51) Int. Cl.
*G06K 9/34* (2006.01)
*G06K 9/62* (2022.01)
*G06F 3/16* (2006.01)
*G10L 15/08* (2006.01)
(Continued)

(52) U.S. Cl.
CPC .............. *G06K 9/6253* (2013.01); *G06F 3/16* (2013.01); *G06K 9/6261* (2013.01); *G06K 9/6263* (2013.01); *G06V 10/22* (2022.01); *G10L 15/08* (2013.01); *G10L 15/22* (2013.01); *G10L 2015/088* (2013.01)

(58) Field of Classification Search
CPC .. G06K 9/6253; G06K 9/2054; G06K 9/6261; G06K 9/6263; G06K 9/00664; G06K 9/00885; G06F 3/16; G06F 40/169; G06F 16/50; G10L 15/08; G10L 15/22; G10L 2015/088; G10L 15/00; G10L 15/34; G10L 25/57
USPC ............ 382/180; 434/127; 705/14.54, 26.41; 715/205, 230, 202; 345/428
See application file for complete search history.

(56) References Cited

U.S. PATENT DOCUMENTS

2012/0094258 A1*  4/2012  Langheier .............. G16H 40/63
                                                        434/127
2014/0082465 A1*  3/2014  Jee ...................... H04N 1/32128
                                                        715/202
(Continued)

FOREIGN PATENT DOCUMENTS

| CN | 102204238 A | 9/2011 |
| CN | 102289468 A | 12/2011 |
| CN | 104504150 A | 4/2015 |

(Continued)

OTHER PUBLICATIONS

International Search Report dated Sep. 18, 2017; PCT/CN2017/077253.
JP 1st OA dated Sep. 8, 2020; 2019-547989.

*Primary Examiner* — Charlotte M Baker

(57) ABSTRACT

An image annotating method includes: acquiring an image collected at a terminal; acquiring voice information associated with the image; annotating the image according to the voice information; and storing an annotated result of the image.

15 Claims, 12 Drawing Sheets

(51) Int. Cl.
  *G10L 15/22* (2006.01)
  *G06V 10/22* (2022.01)

(56) References Cited

U.S. PATENT DOCUMENTS

2014/0108963 A1  4/2014  Black et al.
2018/0204562 A1  7/2018  Gong et al.

FOREIGN PATENT DOCUMENTS

| | | |
|---|---|---|
| CN | 105094760 A | 11/2015 |
| CN | 105095919 A | 11/2015 |
| CN | 106033418 A | 10/2016 |
| CN | 106095764 A | 11/2016 |
| CN | 106156799 A | 11/2016 |
| CN | 106210615 A | 12/2016 |
| JP | 2003069925 A | 3/2003 |
| JP | 2004086124 A | 3/2004 |
| JP | 2005065191 A | 3/2005 |
| JP | 2005276187 A | 10/2005 |
| JP | 2007025648 A | 2/2007 |
| JP | 2007079416 A | 3/2007 |
| JP | 2009272816 A | 11/2009 |
| JP | 2013054417 A | 3/2013 |

\* cited by examiner (a)

(b)

(c)

(d)

IMAGE ANNOTATING METHOD AND ELECTRONIC DEVICE

CROSS-REFERENCE TO RELATED APPLICATIONS

This application is a continuation of International Application No. PCT/CN2017/077253, with an international filing date of Mar. 20, 2017, the entire contents of which are incorporated herein by reference.

TECHNICAL FIELD

The application relates to the technical field of image management and recognition, and in particular, relates to an image annotating method, apparatus and electronic device.

BACKGROUND

In the image recognition process, the key step is to annotate the data samples. For example, in order to train an intelligent recognizer to recognize dogs, a large number of annotated data samples of dogs are required, including pictures of the dogs, as well as characters annotated "dogs", etc.

At present, a common data annotating method is to annotate a large number of collected images and characters on the basis of manpower and computer equipment; and corresponding image recognition training is carried out according to the annotated data samples after the annotated data samples are obtained.

In daily life, real-time acquisition of image samples is required in a mobile state (even via wearable devices, for example, mobile phones, AR glasses, blind guiding helmets, robots and the like) under some situations, and if data can be annotated while the samples are acquired, the complexity of subsequent offline annotating is reduced. However, how to annotate in real time in a mobile state is a problem to be solved. For example, in the case of mobile/wearable devices, it is more difficult for entry of text annotations and selection of image sub-regions.

SUMMARY

An embodiment of the present application provides an image annotating method. The method includes: acquiring an image collected at a terminal; acquiring voice information associated with the image; annotating the image according to the voice information; and storing an annotated result of the image.

Another embodiment of the present application provides an electronic device. The electronic device includes: at least one processor; and, a memory communicatively connected to the at least one processor; wherein the memory stores an instruction program executable by the at least one processor, and the instruction program is executed by the at least one processor to cause the at least one processor to perform the steps of: acquiring an image collected at a terminal; acquiring voice information associated with the image; annotating the image according to the voice information; and storing an annotated result of the image.

Still another embodiment of the present application provides a non-volatile computer readable storage medium. The computer readable storage medium stores computer executable instructions configured to cause a computer to perform the steps of: acquiring an image collected at a terminal; acquiring voice information associated with the image; annotating the image according to the voice information; and storing an annotated result of the image.

BRIEF DESCRIPTION OF THE DRAWINGS

One or more embodiments are exemplarily illustrated by the corresponding figures of the accompanying drawings, which are not to form limiting on the embodiments. In the drawings elements having the same reference numerals represent similar elements. The figures are not to scale unless otherwise indicated.

DETAILED DESCRIPTION

For the purposes, aspects, and advantages of this application to become more clear and understandable, further details of the application are set forth in the accompanying drawings and examples. It should be understood that the specific embodiments described herein are merely illustrative of the present application and are not intended to be limiting thereof.

Figure 1:
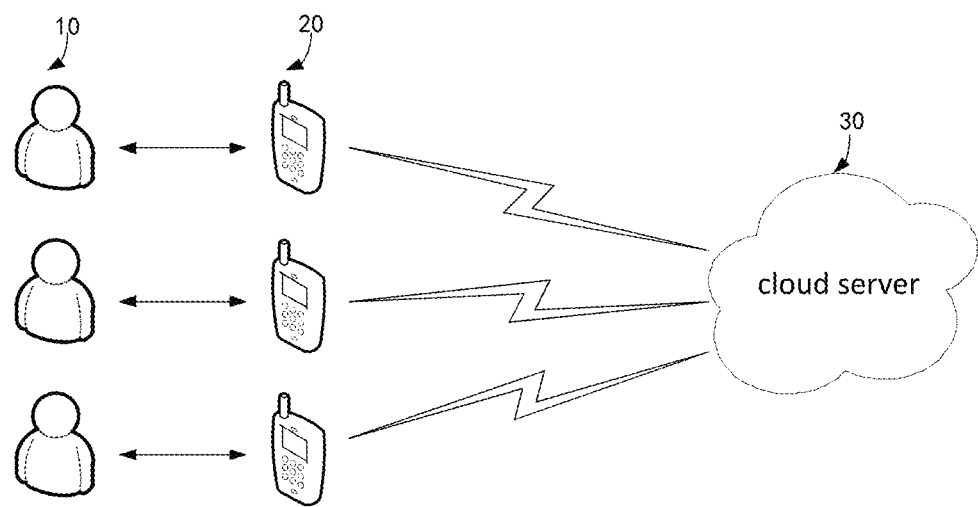
FIG. 1 is a schematic diagram of an operating environment of an image annotating method provided by an embodiment of the present application.

With reference to FIG. 1, it is a schematic diagram of an operating environment of an image annotating method provided by an embodiment of the present application. As shown in FIG. 1, the application environment includes a user 10, a terminal 20 and a cloud 30.

The user 10 may be any number of groups having the same or similar operating behaviors, such as a robot user group, a cell phone user group, an AR (Augmented Reality) glasses user group, a blind guiding helmet user group, etc. The user 10 may also be a single individual. Different users 10 have different personalization requirements, usage habits and requirements, etc., so that each user has its specific user data.

The terminal 20 may be any suitable type of electronic device having a certain logic operation capability and providing one or more functions capable of satisfying a user's intention, which have the functions of image and sound acquisition, sound recognition, display and play, etc. The terminal 20 includes various intelligent terminal equipment, such as robots, intelligent mobile phones, AR glasses, intelligent helmets and the like. The user 10 may interact with the smart terminal 20, enter commands, or control the smart terminal 20 to perform one or more operations via any suitable type of one or more user interaction devices, such as a mouse, a keyboard, remote control, a touch screen, a motion sensitive camera, an audio capture device, etc.

The cloud 30 has functions of data storage and data processing and performs data communication with a terminal 20, including receiving data and sending data. The cloud 30 receives data sent by the terminal 20 and processes the data, particularly annotating the image according to the received image data and voice data, and the cloud 30 can also store the data.

It should be noted that the image annotating method provided by the embodiments of the present application may be further extended to other suitable application environments, and is not limited to the application environment shown in FIG. 1. Although only three users, three terminals, and one cloud server are shown in FIG. 1, those skilled in the art will appreciate that the application environment may also include more or fewer users, terminals, and cloud servers in actual application.

In conjunction with the above-described operating environment, the following describes an embodiment of image annotation based on the terminal 20 and the cloud 30.

Figure 2:
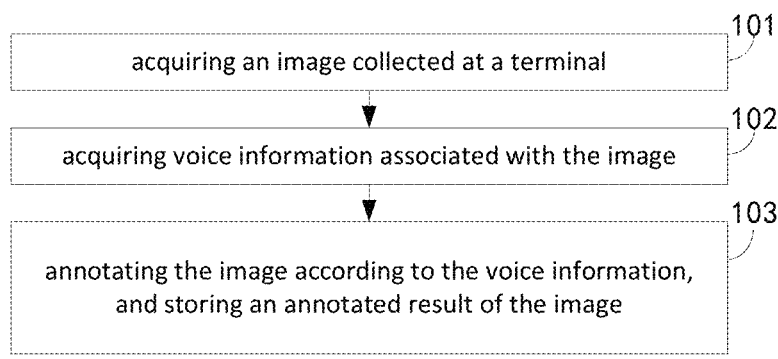
FIG. 2 is a schematic flow diagram of an image annotating method provided by an embodiment of the present application.

With reference to FIG. 2, it is a schematic flow diagram of an image annotating method provided by an embodiment of the present application. The method is applied to a cloud, as shown in FIG. 2, and includes:

step 101, acquiring an image collected at a terminal;

step 102, acquiring voice information associated with the image; and step 103, annotating the image according to the voice information, and storing an annotated result of the image.

In the embodiment of the application, according to the actual scene where the terminal is located, the terminal collects in real time a picture image of objects to be annotated within a preset range by equipment such as a camera and the like; the terminal can be in a static state or a mobile state in the process of collecting the image; after the image of the objects to be annotated is collected, the terminal sends the image to a cloud, and the sent image can be an image which is subjected to compression processing by the terminal, so that the speed of uploading the image to the cloud is improved.

The terminal sends the image to the cloud while uploading the voice information associated with the image to the cloud, and when the cloud cannot automatically annotate the image acquired, the cloud can annotate the image based on the voice information, and store the annotated result of the image.

For example, when only one object to be annotated exists in the image acquired by the terminal, the user can tell the terminal that the image acquired is a "dog" in a voice input mode; the terminal acquires voice information of the user and sends the voice information to the cloud; the cloud terminal extracts key features in the voice information by a voice recognition module, and then annotates the image according to the key features. In addition, the user can also tell the terminal that the collected image is a "dog" by means of text input.

The terminal includes a mobile phone, AR glasses, an intelligent helmet, a robot and the like. The mobile phone, the AR glasses, the intelligent helmet and the robot can shoot images and collect sounds.

The user can annotate a plurality of images by using only one voice input, such as sequentially inputting voice according to the order of image uploading, so that the voice corresponds to the image. The user may also annotate one continuous sequence of images, such as a piece of video for different views of a dog, with only one voice input.

When the cloud stores a large number of image annotating files, and the terminal acquires the image picture of the same object to be annotated again, articles in the image picture can be intelligently identified by the cloud, so that the manual annotating process at the terminal side is saved.

It should be noted that if an unrecognized object is encountered, the terminal can issue the voice "What is this?" by its own voice module to inform a person beside or behind the cloud thereof so as to carry out image annotating locally by an intelligent equipment carried by the terminal (such as annotating by voice or a touch screen, etc.), or annotating at the cloud by a background control device (such as a computer), and storing annotated results to the cloud.

The embodiment of the application provides an image annotating method, which includes the steps of analyzes acquired voice information by using an intelligent tool of the cloud, annotates the acquired image containing an object to be annotated according to the analysis result, and stores the annotated result of the image at the cloud. According to the method, the acquired image can be interactively annotated in real time, and the efficiency and convenience of image annotating are improved.

When a plurality of objects to be annotated are contained in a collected image, for example, a dog and a cat are contained in one picture at the same time, the following embodiment provides an image annotating method in order to annotate objects in the image more accurately.

Figure 3:
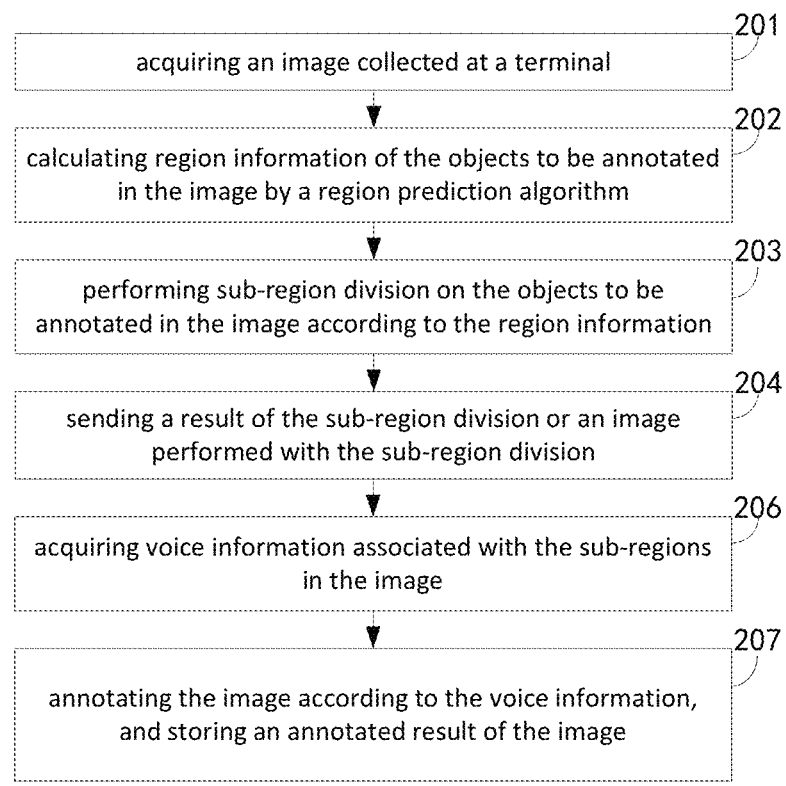
FIG. 3 is a schematic flow diagram of an image annotating method provided by another embodiment of the present application.

With reference to FIG. 3, it is a schematic flow diagram of an image annotating method provided by another embodiment of the present application. As shown in FIG. 3, the method includes:

step 201, acquiring an image collected at a terminal;

step 202, extracting region information of the objects to be annotated in the image by a region extraction algorithm;

Acquiring a target region from an image is an important step in a variety of image processing applications. The region extraction algorithm is used to extract the region of an object to be annotated in the image. There are many related researches in the prior art, such as content-based image retrieval, image compression and encoding based on a region of interest, content-based image authentication, image adaptive display, etc.

In the embodiment of the application, region information of the objects to be annotated in an image is extracted by a region extraction algorithm, for example, the objects to be annotated in the image are one dog and one cat, and at the moment, the region information of the "dog" and the "cat" is extracted, namely the range occupied by the image of the "dog" and the "cat" in the picture image is extracted. Each object to be annotated in the image has its corresponding region information, and the extracted region information can be expressed by a mathematical expression, such as the region information of "dog" and "cat" represented by [a1, a2] respectively. The region extraction algorithm includes a feature point-based extraction method, a visual attention mechanism-based extraction method (such as Itti saliency map model, spectral residual model, etc.), and the like. In the related art, the related region extraction algorithm is described in detail and will not be repeated herein.

step 203, performing sub-region division on the objects to be annotated in the image according to the region information;

After the extracting the region information of the objects to be annotated in the image, the region division is performed on the objects to be annotated in the image based on the region information in the step, and a plurality of sub-regions are divided; the sub-region division process is actually to distinguish the region range corresponding to each object to be annotated after acquiring the region information corresponding to each sub-region. For example, blocks of different colors may be used to specify the sub-region of each object to be annotated, such as a sub-region corresponding to a "dog" represented as a "green box region" and a sub-region corresponding to a "cat" represented as a "red box region". Different colors may also be used to specify the sub-region of each object to be annotated, such as a sub-region of "dog" shown as grey and a sub-region of "cat" shown as black. The regions of the objects to be annotated in the image can also be distinguished in other ways. It is to be noted that accurate sub-region division can effectively improve the accuracy of annotating the image when more kinds of objects to be annotated are contained in an image.

step 204, sending a result of the sub-region division or an image performed with the sub-region division;

After the sub-region division of the image, the cloud can send the result of the sub-region division to the terminal, and the terminal superimposes the result of the sub-region division on the acquired image, so that the image performed with the sub-region division is displayed for the terminal user. The cloud can also directly send the image performed with the sub-region division to the terminal, and the terminal only needs to display the image performed with the sub-region division.

step 206, acquiring voice information associated with a sub-region in the image;

After receiving the result of the sub-region division sent by the cloud terminal or the image performed with the sub-region division, the terminal can acquire the image containing the sub-region; at the moment, for each sub-region of the image, the terminal acquires key information related to the sub-region, and then sends the key information to the cloud terminal.

For example, the user selects one sub-region in the image displayed by the terminal via a touch screen or the like, and inputs "this is a dog" through voice; at the moment, the key information of the sub-region is the voice information, and the terminal sends the voice information to the cloud.

For example, the user inputs voice information of "the red region is a dog" and "the green region is a cat" directly by the terminal; at the moment, the key information is the two voice information, and the terminal sends the collected voice information to the cloud.

step 207, annotating the image according to the voice information, and storing an annotated result of the image.

As can be appreciated, the voice information is voice information corresponding to a sub-region in the image, and the cloud can extract keywords in the voice information based on the voice recognition by the voice recognition module and establish a mapping relation table between the keywords and the sub-regions, for example, <a1, t1>, <a2, t2>, <a3, t3>, . . . . Thus the sub-region is annotated according to the mapping relation table, and an annotated result is stored, for example, <a1, t1>=<red region, "dog">; <a2, t2>=<green region, "cat">; where the keyword corresponds to the sub-region, each sub-region may contain one or more keywords, and when a sub-region contains a plurality of keywords, the sub-region may be annotated with the plurality of keywords, for example, <a1, t1>=<red region, "dog" "Samoyed" "white">.

In the embodiment of the application, for the situation that a plurality of objects to be annotated are contained in an image, sub-region division is firstly performed on the image, voice information of each sub-region is acquired in a human-terminal interaction mode based on the divided sub-regions, then the voice information is sent to a cloud terminal, and the cloud terminal annotates the sub-regions in the image according to the voice information. Through the embodiment, the accuracy rate of image annotating can be improved, and sub-regions are annotated after being divided, so that the efficiency of image annotating is improved.

It will be appreciated that in the process of sub-region division at the cloud, there are errors in the sub-region division of the image due to noise and the like of the image, such as dividing two objects to be annotated into one sub-region, dividing a region which is not the object to be annotated into one sub-region, or not dividing some objects to be annotated into a sub-region. In order to avoid affecting the accuracy and integrity of image annotation, the following embodiment provides an image annotating method.

Figure 4:
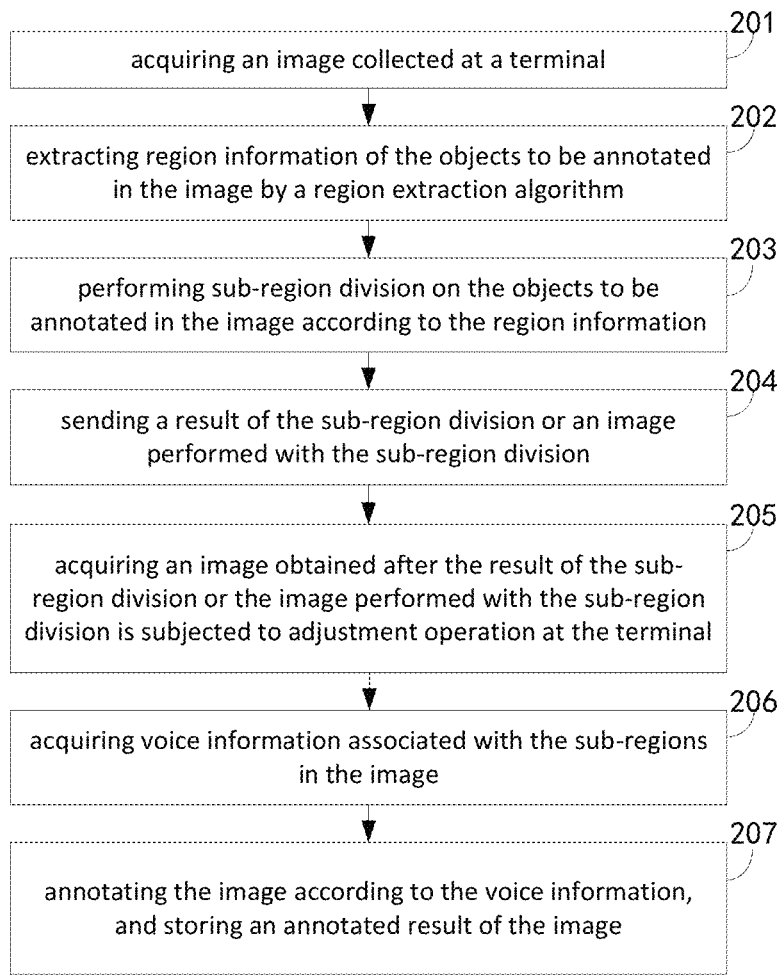
FIG. 4 is a schematic flow diagram of an image annotating method provided by yet another embodiment of the present application.

With reference to FIG. 4, it is a schematic flow diagram of an image annotating method provided by yet another embodiment of the present application. The main difference between FIG. 4 and FIG. 3 is that when a cloud sends a result of the sub-region division or an image performed with sub-region division to a terminal, the method further includes:

step 205, acquiring the result of the sub-region division or an image subjected to the adjustment operation on the image performed with the sub-region division at the terminal.

In the embodiment of the application, after the cloud sends the result of sub-region division or the image performed with the sub-region division to the terminal, the terminal can adjust the image to confirm that the sub-region divided at the cloud is accurate and suitable. For example, the terminal may accept that the user fine-tunes the position and size of the color box by touching the screen to adapt to the object to be annotated therein, the terminal may accept that the user deletes redundant boxes in the image, such as the box with no object to be annotated, and the terminal may also accept that the user adds a missing box in the image, etc.

It should be noted that after the terminal performs the adjustment operation on the divided sub-regions, when voice information is collected based on the sub-regions, the voice information is collected based on the adjusted sub-regions of the image, and the cloud annotates the image after the adjustment operation according to the voice information.

In the embodiment of the application, the divided sub-region is adjusted by the terminal, the adjusted image is sent to the cloud, and the cloud annotates the sub-region of the image according to the confirmed image and the voice information of the sub-region of the confirmed image. The accuracy and the integrity of the object to be annotated in the image are guaranteed when the object to be annotated is annotated.

Figure 5:
FIGS. 5(a)-(d) are exemplary schematic diagrams of an image annotating method provided by an embodiment of the present application.
Figure 5:
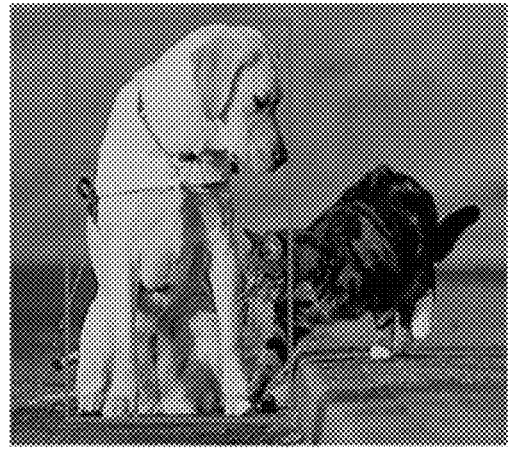
Figure 5:
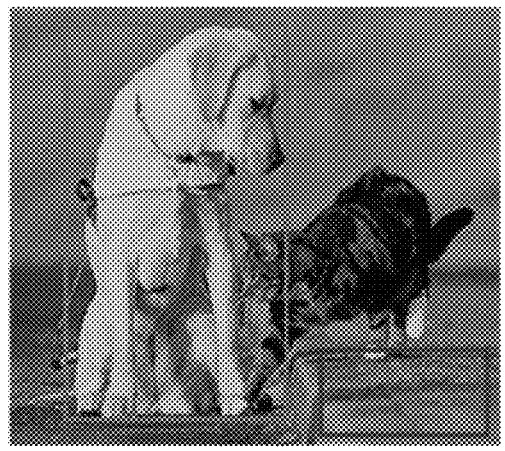
Figure 5:
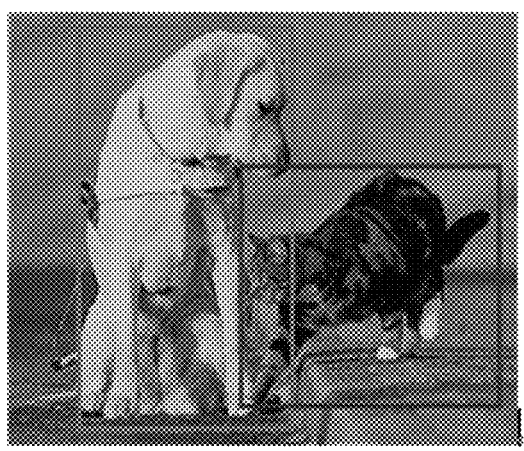

Based on the above-described embodiment, it is exemplified that an image collected at a terminal includes a plurality of objects to be annotated, and the image may be as shown in FIG. 5(a), including two objects to be annotated, namely, a "dog" and a "cat"; the objects to be annotated in the image are divided into sub-regions by the above-described region extraction algorithm, and the result of the division is as shown in FIG. 5(b) or FIG. 5(c); at the user terminal side, it can be found that the result of the sub-region division of the object to be annotated in FIG. 5(b) or FIG. 5(c) is incomplete or has errors; at the moment, the user can adjust the result of sub-region division or the image performed with sub-region division; and the adjusted image is shown in FIG. 5(d), and the terminal sends the adjusted image to the cloud, and sends the voice information associated with the sub-region of the adjusted image, so that the cloud can annotate the image subjected to sub-region adjustment according to the received voice information.

Figure 6:
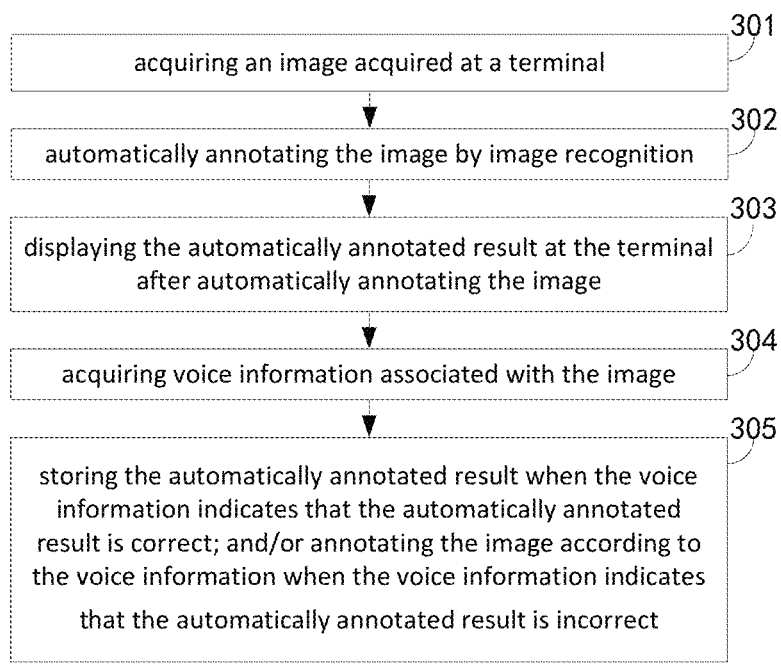
FIG. 6 is a schematic flow diagram of an image annotating method provided by yet another embodiment of the present application.

With reference to FIG. 6, it is a schematic flow diagram of an image annotating method provided by yet another embodiment of the present application. As shown in FIG. 6, the method includes:

step 301, acquiring an image collected at a terminal;

step 302, automatically annotating the image by image recognition;

step 303, displaying an automatically annotated result at the terminal after automatically annotating the image;

step 304, acquiring voice information associated with the image; and step 305, storing the automatically annotated result when the voice information indicates that the automatically annotated result is correct; and/or annotating the image according to the voice information when the voice information indicates that the automatically annotated result is incorrect.

The image annotating method provided by the embodiment of the application can be automatically completed by the cloud without receiving voice information collected by the terminal side.

Specifically, after the cloud acquires the image, the image is automatically annotated based on an image recognition method. For example, the cloud first divides the received image into sub-regions, and then automatically annotates each sub-region by using an object recognition method, which includes annotating one object to be annotated in the image and annotating a plurality of objects to be annotated in the image, thereby completing the annotating of the image. The cloud can divide the sub-regions of the image by a region extraction algorithm, and the specific process can be described with reference to the above embodiment.

Based on the field of computer vision, the object recognition method is mainly used for solving the problem of accurate detection and recognition of an object, which includes selecting effective image feature points, reducing the influence caused by occlusion and image noise in the object recognition process, achieving better object recognition precision and the like.

It should be noted that in addition to identifying an object in an image, the object identification method may also identify characters, i.e. characters on the object identified as an alternative annotation for the object, e.g. identifying a character "milk" on a box, where the annotation for the box includes "milk".

Furthermore, after automatically annotating the image based on the object recognition method, the cloud can also send the annotated result of the image to the terminal and display it at the terminal; the terminal user can confirm whether the wrong annotated result exists, and if the error exists in the automatically annotated result, the annotated result can be modified. For example, the automatically annotated result may be modified by voice, such as deleting the annotation "pig" corresponding to the red region by touching the screen, and generating an annotation "dog" for the red region by voice "this is a dog". An annotation missing from the automatically annotated result can also be added by voice, for example, a touch screen selects an object "cat" to be annotated, and then the voice "this is cat" is input so as to generate a new annotation; and the process can also be performed by inputting characters. It is also possible to delete redundant annotations in the automatically annotated result by voice, etc.

If the automatically annotated result is correct, the automatically annotated result is stored.

The embodiment of the application provides an image annotating method, which includes the steps of automatically annotating an acquired image by a cloud, judging whether the automatically annotated result is correct or not at a terminal, storing the annotated result if the annotated result is correct, and adjusting the annotated result according to voice information if the annotated result is incorrect. The embodiment not only can shorten the time period of image annotating, but also can obviously improve the correctness of an image annotated result and the accuracy of image recognition.

Figure 7:
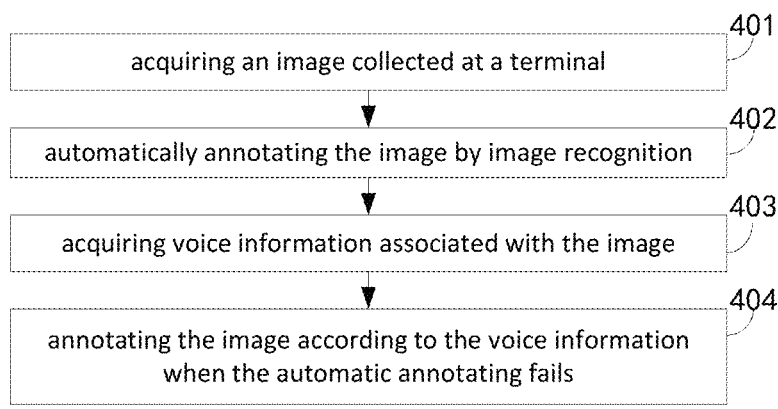
FIG. 7 is a schematic flow diagram of an image annotating method provided by a further embodiment of the present application.

With reference to FIG. 7, it is a schematic flow diagram of an image annotating method provided by a further embodiment of the present application. As shown in FIG. 7, the method includes:

step 401, acquiring an image collected at a terminal;

step 402, automatically annotating the image by image recognition;

step 403, acquiring voice information associated with the image; and step 404, annotating the image according to the voice information when automatic annotating fails.

According to the image annotating method provided by the embodiment of the application, for the situation that automatic annotating of the image at the cloud fails, the image is annotated again according to the acquired voice information.

The process of automatically annotating the image by the cloud and the process of annotating the image again according to the voice information can be described with reference to the above-mentioned embodiments and will not be repeated herein.

The cloud can be used for judging whether the automatic annotating is successful or not, the terminal can be used for feeding back whether the automatic annotating is successful or not, and other modes can be used for judging it, which is not limited herein.

The image annotating method provided by the embodiment of the application includes automatically annotating an image at the cloud, and annotating the image by the acquired voice information when the automatic annotating fails. According to the embodiment, it can successfully annotate the image and shorten the annotating time, with more convenient annotating modes.

It should be noted that the method of each of the above embodiments may refer to a method independently executed by a corresponding functional module in a cloud server, or a method collectively executed by a system including a functional module in a cloud and a functional module in a terminal. The acquiring in the steps 101 and 102 can refer to receiving images and voice information sent by a terminal when the image is annotated independently by the function module in the cloud; displaying the annotated result at the terminal can mean sending the annotated result to the terminal and displaying it by the terminal. When executed together by a system composed of a cloud and a terminal, the above-mentioned acquiring may refer to acquiring images and voices via a hardware of the terminal invoked by a function module at the terminal, and displaying corresponding contents at the terminal. It is to be understood that the objectives of the present application may be achieved in what kind of ways, and, accordingly, are intended to fall within the scope of the present application.

Figure 8:
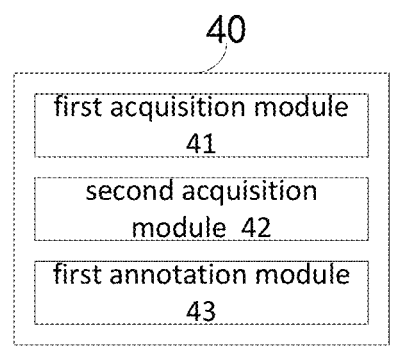
FIG. 8 is a schematic structural view of an image annotating apparatus provided by an embodiment of the present application.

With reference to FIG. 8, it is a schematic structural view of an image annotating apparatus provided by an embodiment of the present application. As shown in FIG. 8, the apparatus 40 includes a first acquisition module 41, a second acquisition module 42, and a first annotation module 43.

The first acquisition module 41 is configured to acquire an image collected at the terminal; a first acquisition module 42 is configured to acquire voice information associated with the image; and the first annotation module 43 is configured to annotate the image according to the voice information and storing an annotated result of the image.

In the embodiment of the application, the first acquisition module 41 and the second acquisition module 42 are respectively connected with the first annotation module 43, and the first annotation module 43 annotates the image according to the received image and voice information.

It should be noted that since the information interaction, the execution process and the like between the modules in the above-mentioned apparatus are based on the same concept as the method embodiment of the present application, the detailed contents can be referred to the description in the method embodiment of the present application, and the detailed description thereof will not be repeated herein The embodiment of the application provides an image annotating apparatus, which analyzes the acquired voice information by an intelligent tool of a cloud, annotates the acquired image containing an object to be annotated according to the analysis result, and stores the annotated result of the image at the cloud. The apparatus can annotate the acquired image in real time, which improves efficiency of the image annotating.

Figure 9:
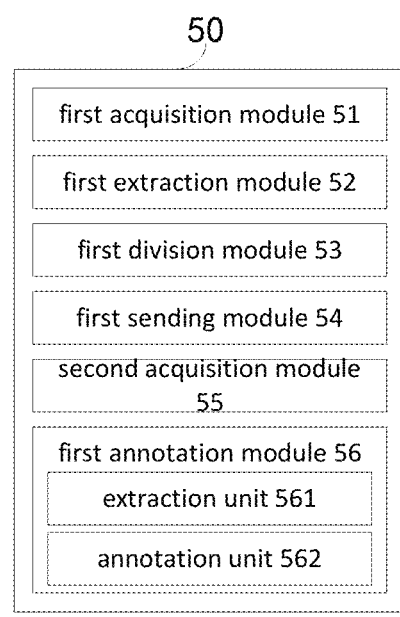
FIG. 9 is a schematic structural view of an image annotating apparatus provided by another embodiment of the present application.

With reference to FIG. 9, it is a schematic structural view of an image annotating apparatus provided by another embodiment of the present application. Embodiments of the present application are directed to one implementation in which a received image includes a plurality of objects to be annotated. As shown in FIG. 9, the apparatus 50 includes a first acquisition module 51, a first extraction module 52, a first division module 53, a first sending module 54, a second acquisition module 55, and a first annotation module 56.

The first acquisition module 51 is configured to acquire an image collected at a terminal; the first extraction module 52 is configured to extract region information of the objects to be annotated in the image by a region extraction algorithm; the first division module 53 is configured to perform sub-region division on the objects to be annotated in the image according to the region information; the first sending module 54 is configured to send a result of the sub-region division or an image performed with the sub-region division; the second acquisition module 55 is configured to acquire voice information associated with a sub-region in the image; the first annotation module 56 is configured to annotate the image according to the voice information and storing an annotated result of the image.

The first annotation module 56 includes an extraction unit 561 and an annotation unit 562. The extraction unit 561 is configured to extract keywords in the voice information based on voice recognition, wherein the keywords correspond to the sub-regions; the annotation unit 562 is configured to establish a mapping relation table between the keywords and the sub-regions, annotating the sub-regions according to the mapping relation table, and storing an annotated result.

In some embodiments, the apparatus further includes a third acquisition module configured to acquire an image obtained after the result of the sub-region division or the image performed with the sub-region division is subjected to adjustment operation at the terminal. At the moment, the first annotation module 56 is specifically configured to annotate the image subjected to the adjustment operation according to the voice information, and storing an annotated result of the image.

Figure 10:
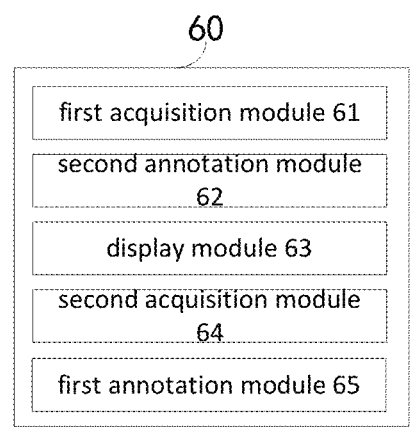
FIG. 10 is a schematic structural view of an image annotating apparatus provided by yet another embodiment of the present application.

With reference to FIG. 10, it is a schematic structural view of an image annotating apparatus provided by yet another embodiment of the present application. As shown in FIG. 10, the apparatus 60 includes a first acquisition module 61, a second annotation module 62, a display module 63, a second acquisition module 64, and a first annotation module 65.

The first acquisition module 61 is configured to acquire an image collected at the terminal; the second annotation module 62 is configured to automatically annotate the image by image recognition; the display module 63 is configured to display an automatically annotated result at a terminal after automatically annotating the image; the second acquisition module 64 is configured to acquire voice information associated with the image; the first annotation module 65 is configured to store the automatically annotated result when the voice information indicates that the automatically annotated result is correct; and/or annotating the image according to the voice information when the voice information indicates that the automatically annotated result is incorrect.

It should be noted that since the information interaction, the execution process and the like between the modules in the above-mentioned apparatus are based on the same concept as the method embodiment of the present application, the detailed contents can be referred to the description in the method embodiment of the present application, and the detailed description thereof will not be repeated herein.

The embodiment of the application provides an image annotating apparatus, which automatically annotates an acquired image by a cloud, judges whether a result of the automatic annotating is correct at a terminal, stores the annotated result if the annotated result is correct, and adjusts the annotated result according to voice information if the annotated result is incorrect. The embodiment not only can shorten the time period of image annotating, but also can obviously improve the correctness of an image annotated result and the accuracy of image recognition.

Figure 11:
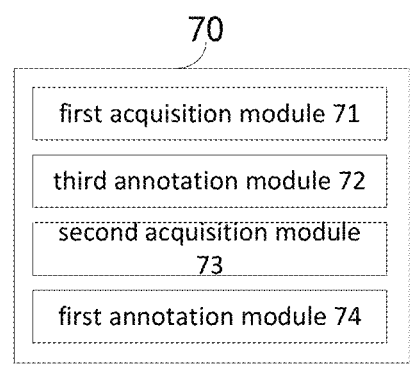
FIG. 11 is a schematic structural view of an image annotating apparatus provided by yet another embodiment of the present application.

With reference to FIG. 11, it is a schematic structural view of an image annotating apparatus provided by yet another embodiment of the present application. As shown in FIG. 11, the apparatus 70 includes a first acquisition module 71, a third annotation module 72, a second acquisition module 73, and a first annotation module 74.

The first acquisition module 71 is configured to acquire an image collected at a terminal; the third annotation module 72 is configured to automatically annotate the image by image recognition; the second acquisition module 73 is configured to acquire voice information associated with the image; the first annotation module 74 is configured to annotate the image according to the voice information when the automatic annotating fails.

It should be noted that since the information interaction, the execution process and the like between the modules in the above-mentioned apparatus are based on the same concept as the method embodiment of the present application, the detailed contents can be referred to the description in the method embodiment of the present application, and the detailed description thereof will not be repeated herein.

The image annotating apparatus provided by the embodiment of the application can automatically annotate the image at the cloud, and annotate the image by the acquired voice information when the automatic annotating fails. According to the embodiment, the image can be successfully annotated, the annotating time is shortened, and the annotating mode is more convenient.

Figure 12:
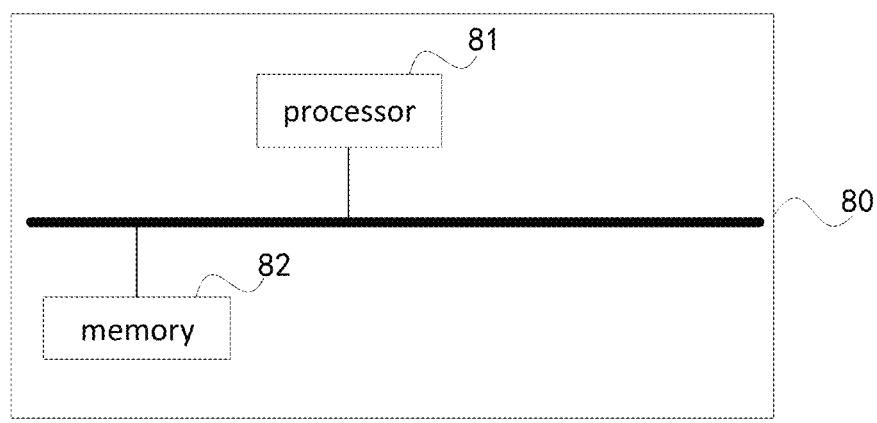
FIG. 12 is a schematic structural view of a hardware of an electronic device provided by an embodiment of the present application.

With reference to FIG. 12, it is a schematic structural view of a hardware of electronic device 80 capable of performing the image annotating method described above, provided by an embodiment of the present application. The electronic device may be a cloud server or a system including a terminal and a cloud server.

As shown in FIG. 12, the electronic device 80 includes one or more processors 81 and a memory 82, such as one memory 81 shown in FIG. 12.

The processor 81 and the memory 82 may be connected by a bus or other methods, such as by bus connection in FIG. 12.

The memory 81, as a non-volatile computer readable storage medium, may be used to store non-volatile software programs, non-volatile computer-executable programs, and modules, such as program instructions/modules corresponding to the image annotating method in embodiments of the present application (e.g., the first acquisition module 41, second acquisition module 42, and first annotation module 43 shown in FIG. 8). The processor 81 executes various functional applications and data processing of the server by running non-volatile software programs, instructions and modules stored in the memory 82, so as to implement the above-described method embodiment of the image annotating method.

The memory 82 may include a storage program area and a storage data area, wherein the storage program area may store an application program required by an operating system or at least one function; the storage data area may store data or the like created according to the use of the image annotating device. In addition, the memory 82 may include a high-speed random access memory, and may also include a non-volatile memory, such as at least one magnetic disk storage device, a flash memory device, or other non-volatile solid state memory device. In some embodiments, the memory 82 may include a memory remotely located relative to the processor 81, and such remote memory may be connected to the image annotating device via a network. Examples of such networks include, but are not limited to, the Internet, intranets, local area networks, mobile communication networks, and combinations thereof.

The one or more modules are stored in the memory 82 and, when executed by the one or more processors 81, perform the image annotating method in any of the method embodiments described above.

Embodiments of the present application provide a non-volatile computer readable storage medium storing computer-executable instructions to be executed by electronic device to perform the image annotating method of any of the method embodiments described above, e.g., to perform the method steps 101-103 in FIG. 2, 201-204 in FIGS. 3, 206 and 207, 201-207 in FIG. 4, 301-305 in FIG. 6, 401-404 in FIG. 7 described above are executed to implement the functions of the modules 41-43 in FIG. 8, the modules 51-56 in FIG. 9, the units 561-562, the modules 61-65 in FIG. 10, and the modules 71-74 in FIG. 11.

Embodiments of the present application also provide a computer program product including a computer program stored on a non-volatile computer readable storage medium, the computer program including program instructions which, when executed by a computer, cause the computer to perform the image annotating method in any of the method embodiments described above, e.g. to perform the method steps 101 to 103 in FIGS. 2, 201 to 204 in FIG. 3, steps 206 and 207, method steps 201-207 in FIG. 4, 301-305 in FIG. 6, 401-404 in FIG. 7 described above are executed to implement the modules 41-43 in FIG. 8, the modules 51-56 in FIG. 9, the units 561-562, the modules 61-65 in FIG. 10 and the modules 71-74 in FIG. 11.

Those skilled in the art would further appreciate that the units and algorithm steps of the examples described in combination with the embodiments disclosed herein may be implemented by electronic hardware, computer software, or combinations of both. The constitution and steps of the examples are described above generally in terms of their functionality in order to clearly illustrate this interchangeability of hardware and software. Whether such functionality is implemented by hardware or software depends upon the particular application and design constraints of the technical solution. Those skilled in the art may implement the described functionality in varying ways for each particular application, but such implementation is not intended to exceed the scope of the present application. The computer software may be stored in a computer readable storage medium, and the program, when executed, may include the flow of embodiments of the methods as above. The storage medium may be a magnetic disk, an optical disk, a read-only memory, a random access memory, etc.

The above is only the implementation of the present invention and not intended to limit the scope of the invention; all variants of equivalent structures or flow made by the description and accompanying drawings of the invention, or applications in other related technical fields directly or indirectly fall within the scope of the present invention.

What is claimed is:

1. An image annotating method, comprising:
acquiring an image collected at a terminal;
acquiring voice information associated with the image;
extracting key features in the voice information;
annotating the image according to the key features; and
storing an annotated result of the image;
wherein prior to acquiring voice information associated with the image, the method comprises:
automatically annotating the image by image recognition;
wherein the annotating the image according to the voice information comprises:
annotating the image according to the voice information when automatic annotating fails.

2. The method according to claim 1, wherein the image comprises a plurality of objects to be annotated, prior to acquiring voice information associated with the image, the method further comprising:
extracting region information of the objects to be annotated in the image by a region extraction algorithm;
performing sub-region division on the objects to be annotated in the image according to the region information;
sending a result of the sub-region division or an image performed with the sub-region division;
wherein the acquiring voice information associated with the image comprises: acquiring voice information associated with a sub-region in the image.

3. The method according to claim 2, wherein after the sending the result of the sub-region division or the image performed with the sub-region division, the method further comprises:

acquiring an image obtained after the result of the sub-region division or the image performed with the sub-region division is subjected to adjustment operation at the terminal;

the annotating the image according to the voice information comprises: annotating the image subjected to the adjustment operation according to the voice information.

4. The method according to claim 1, wherein the annotating the image according to the voice information; and storing the annotated result of the image comprises:

extracting keywords in the voice information based on voice recognition, wherein the keywords correspond to sub-regions; and establishing a mapping relation table between the keywords and the sub-regions;

annotating the sub-regions according to the mapping relation table; and storing the annotated result.

5. The method according to claim 1, wherein prior to acquiring voice information associated with the image, the method comprises:

automatically annotating the image by image recognition;

displaying an automatically annotated result at the terminal after automatically annotating the image;

wherein the annotating the image according to the voice information comprises:

storing the automatically annotated result when the voice information indicates that the automatically annotated result is correct; and/or annotating the image according to the voice information when the voice information indicates that the automatically annotated result is incorrect.

6. An electronic device, comprising:

at least one processor; and, a memory communicatively connected to the at least one processor;

wherein the memory stores an instruction program executable by the at least one processor, and the instruction program is executed by the at least one processor to cause the at least one processor to perform the steps of:

acquiring an image collected at a terminal;

acquiring voice information associated with the image;

extracting key features in the voice information;

annotating the image according to the key features; and storing an annotated result of the image;

wherein prior to acquiring voice information associated with the image, the instruction program is executed by the at least one processor to cause the at least one processor to perform the steps of:

automatically annotating the image by image recognition;

wherein the annotating the image according to the voice information comprises:

annotating the image according to the voice information when automatic annotating fails.

7. The electronic device according to claim 6, wherein prior to acquiring voice information associated with the image, the instruction program is executed by the at least one processor to cause the at least one processor to perform the steps of:

automatically annotating the image by image recognition;

displaying an automatically annotated result at the terminal after automatically annotating the image;

wherein the annotating the image according to the voice information comprises:

storing the automatically annotated result when the voice information indicates that the automatically annotated result is correct; and/or annotating the image according to the voice information when the voice information indicates that the automatically annotated result is incorrect.

8. The electronic device according to claim 6, wherein the image comprises a plurality of objects to be annotated, and wherein prior to acquiring voice information associated with the image, the instruction program is executed by the at least one processor to cause the at least one processor to perform the steps of:

extracting region information of the objects to be annotated in the image by a region extraction algorithm;

performing sub-region division on the objects to be annotated in the image according to the region information;

sending a result of the sub-region division or an image performed with the sub-region division;

wherein the acquiring voice information associated with the image comprises: acquiring voice information associated with a sub-region in the image.

9. The electronic device according to claim 8, wherein after the sending the result of the sub-region division or the image performed with the sub-region division, the instruction program is executed by the at least one processor to cause the at least one processor to perform the steps of:

acquiring an image obtained after the result of the sub-region division or the image performed with the sub-region division is subjected to adjustment operation at the terminal;

the annotating the image according to the voice information comprises: annotating the image subjected to the adjustment operation according to the voice information.

10. The electronic device according to claim 6, wherein the annotating the image according to the voice information; and storing the annotated result of the image comprises:

extracting keywords in the voice information based on voice recognition, wherein the keywords correspond to sub-regions; and establishing a mapping relation table between the keywords and the sub-regions;

annotating the sub-regions according to the mapping relation table; and storing the annotated result.

11. A non-volatile computer readable storage medium, wherein the computer readable storage medium stores computer executable instructions configured to cause a computer to perform the steps of:

acquiring an image collected at a terminal;

acquiring voice information associated with the image;

extracting key features in the voice information;

annotating the image according to the key features; and storing an annotated result of the image;

wherein prior to acquiring voice information associated with the image, the computer executable instructions configured to cause the computer to perform the steps of:

automatically annotating the image by image recognition;

wherein the annotating the image according to the voice information comprises:

annotating the image according to the voice information when automatic annotating fails.

12. The non-volatile computer readable storage medium according to claim 11, wherein the annotating the image according to the voice information; and storing the annotated result of the image comprises:

extracting keywords in the voice information based on voice recognition, wherein the keywords correspond to sub-regions; and establishing a mapping relation table between the keywords and the sub-regions;

annotating the sub-regions according to the mapping relation table; and storing the annotated result.

13. The non-volatile computer readable storage medium according to claim 11, wherein prior to acquiring voice information associated with the image, the computer executable instructions configured to cause the computer to perform the steps of:

automatically annotating the image by image recognition;

displaying an automatically annotated result at the terminal after automatically annotating the image;

wherein the annotating the image according to the voice information comprises:

storing the automatically annotated result when the voice information indicates that the automatically annotated result is correct; and/or annotating the image according to the voice information when the voice information indicates that the automatically annotated result is incorrect.

14. The non-volatile computer readable storage medium according to claim 11, wherein the image comprises a plurality of objects to be annotated, prior to acquiring voice information associated with the image, the computer executable instructions configured to cause the computer to perform the steps of:

extracting region information of the objects to be annotated in the image by a region extraction algorithm;

performing sub-region division on the objects to be annotated in the image according to the region information;

sending a result of the sub-region division or an image performed with the sub-region division;

wherein the acquiring voice information associated with the image comprises: acquiring voice information associated with a sub-region in the image.

15. The non-volatile computer readable storage medium according to claim 14, wherein after the sending the result of the sub-region division or the image performed with the sub-region division, the computer executable instructions configured to cause the computer to perform the steps of:

acquiring an image obtained after the result of the sub-region division or the image performed with the sub-region division is subjected to adjustment operation at the terminal;

the annotating the image according to the voice information comprises: annotating the image subjected to the adjustment operation according to the voice information.

\* \* \* \* \*